US012492646B2

(12) United States Patent
Awano et al.

(10) Patent No.: US 12,492,646 B2
(45) Date of Patent: Dec. 9, 2025

(54) HYDRAULIC DRIVE VALVE MONITORING DEVICE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Ryosuke Awano, Chiba Chiba (JP); Koichi Nagaishi, Yokohama Kanagawa (JP); Issei Tsutsui, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

(*) Notice: Subject to any disclaimer, the term of this patent is extended or adjusted under 35 U.S.C. 154(b) by 136 days.

(21) Appl. No.: 18/357,536

(22) Filed: Jul. 24, 2023

(65) Prior Publication Data

US 2024/0052756 A1 Feb. 15, 2024

(30) Foreign Application Priority Data

Aug. 10, 2022 (JP) ................................ 2022-127906
Jul. 3, 2023 (JP) ................................ 2023-109317

(51) Int. Cl.

*F01D 17/26* (2006.01)
*F01D 21/00* (2006.01)
*F15B 19/00* (2006.01)

(52) U.S. Cl.

CPC .......... *F01D 17/26* (2013.01); *F01D 21/003* (2013.01); *F15B 19/005* (2013.01); *F05D 2270/301* (2013.01); *F05D 2270/64* (2013.01)

(58) Field of Classification Search

CPC ...... F01D 17/26; F01D 21/003; F01D 17/145; F15B 19/005

See application file for complete search history.

(56) References Cited

FOREIGN PATENT DOCUMENTS

| | | | | | |
|---|---|---|---|---|---|
| CN | 106340334 | A | * | 1/2017 | |
| JP | 2018-131923 | A | | 8/2018 | |
| JP | 2021195912 | A | * | 12/2021 | ........... F01D 17/145 |
| WO | WO-2023171016 | A1 | * | 9/2023 | |

* cited by examiner

*Primary Examiner* — Nathaniel E Wiehe
*Assistant Examiner* — Daniel S Collins
(74) *Attorney, Agent, or Firm* — Foley & Lardner LLP

(57) ABSTRACT

A hydraulic drive valve monitoring device includes a determination part and an alarm part. The determination part is configured to determine whether there is a sign of failure in the hydraulic drive valve device based on a result of comparison between a transition of a working fluid pressure measurement value obtained by measuring a pressure of the working fluid flowing into the valve body part and a transition of a working fluid pressure reference value set for the pressure of the working fluid flowing into the valve body part, when the opening degree of the valve body part is changed. The alarm part is configured to output an alarm when the determination part determines that there is a sign of failure in the hydraulic drive valve device.

5 Claims, 11 Drawing Sheets

HYDRAULIC DRIVE VALVE MONITORING DEVICE

CROSS REFERENCE TO RELATED APPLICATIONS

This application is based upon and claims the benefit of priority from Japanese Patent Application No. 2022-127906, filed on Aug. 10, 2022, and Japanese Patent Application No. 2023-109317, filed on Jul. 3, 2023; the entire contents of which are incorporated herein by reference.

FIELD

Embodiments of the present invention relate to a hydraulic drive valve monitoring device.

BACKGROUND

In a turbine plant, a hydraulic drive valve is used. The hydraulic drive valve is installed to control the flow rate and the pressure of working fluid (for example, steam) to be introduced into a turbine and, in addition, to shut a flow path of the working fluid at emergency. The hydraulic drive valve is configured to change in opening degree by the action of a control oil.

In the case where a failure occurs in the hydraulic drive valve, operation stop of the turbine plant is executed out of plan and a check of the hydraulic drive valve is performed. In the check of the hydraulic drive valve, the hydraulic drive valve is disassembled to open the inside and components of the hydraulic drive valve are investigated. A period of the operation stop performed out of plan is a long period in some cases according to the failure point of the hydraulic drive valve and the degree of the failure.

Therefore, in order to avoid a decrease in operation rate of the turbine plant operation due to the failure of the hydraulic drive valve, a hydraulic drive valve monitoring device which monitors the state of the hydraulic drive valve is suggested.

For example, in the hydraulic drive valve monitoring device, an alarm is output when the relation between a measurement value of the opening degree of the hydraulic drive valve and a measurement value of the pressure of the control oil acting when obtaining the measurement value of the opening degree is largely different from a predetermined relation. With this, a sign of failure of the hydraulic drive valve can be recognized in advance, so that it is possible to prevent execution of an operation stop out of plan on the turbine plant. Further, it is possible to grasp the cause of failure of the hydraulic drive valve in advance from the sign of failure detected about the hydraulic drive valve, and therefore even in the case where the operation stop of the turbine plant is planned for a check of the hydraulic drive valve, the planned operation stop period can be shortened.

However, in the prior art, the cause of failure cannot be identified only by finding an abnormality in the measurement value of the pressure of the control oil, and therefore it is impossible to sufficiently detect a sign of failure of the hydraulic drive valve and it is difficult to accurately prevent a decrease in operation rate of the turbine plant in some cases.

Therefore, a problem to be solved by the present invention is to provide a hydraulic drive valve monitoring device capable of accurately grasping a sign of failure of a hydraulic drive valve and effectively preventing a decrease in operation rate of a turbine plant.

DETAILED DESCRIPTION

A hydraulic drive valve monitoring device in an embodiment monitors a hydraulic drive valve device including a valve body part installed in a flow path of working fluid introduced into a turbine and a valve drive part provided to change an opening degree of the valve body part by an action of a control oil. The hydraulic drive valve monitoring device includes a determination part and an alarm part. The determination part is configured to determine whether there is a sign of failure in the hydraulic drive valve device based on a result of comparison between a transition of a working fluid pressure measurement value obtained by measuring a pressure of the working fluid flowing into the valve body part and a transition of a working fluid pressure reference value set for the pressure of the working fluid flowing into the valve body part, when the opening degree of the valve body part is changed. The alarm part is configured to output an alarm when the determination part determines that there is a sign of failure in the hydraulic drive valve device.

First Embodiment

[A] Configuration of a Turbine Plant 600

Figure 1:
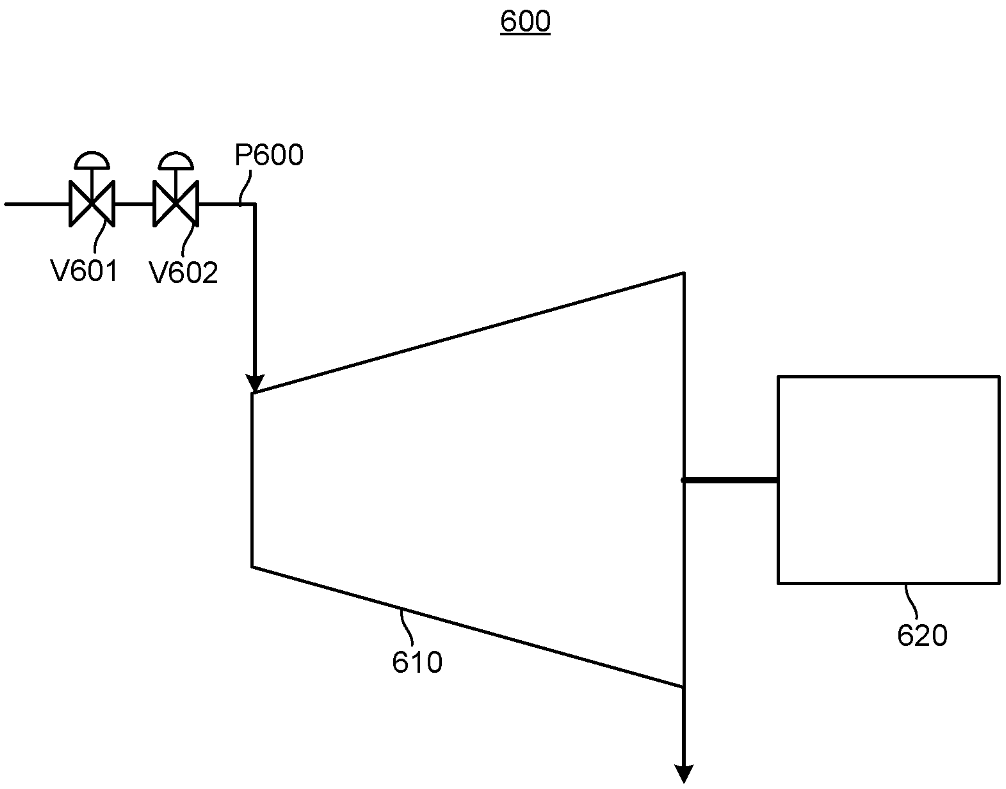
FIG. 1 is a diagram schematically illustrating a configuration of a turbine plant 600 according to a first embodiment.

FIG. 1 is a diagram schematically illustrating a configuration of a turbine plant 600 according to a first embodiment.

As illustrated in FIG. 1, the turbine plant 600 includes a turbine 610 and a power generator 620.

The turbine 610 is, for example, an axial flow type-steam turbine and is configured such that its turbine rotor rotates by introduction of working fluid ST (steam) from a boiler (not illustrated) via an inlet pipe P600.

The power generator 620 has a rotary shaft coupled to the turbine rotor of the turbine 610, and is configured to be driven by the rotation of the turbine rotor to output electric power.

The inlet pipe P600 is provided with a stop valve V601 and a regulator valve V602. The stop valve V601 is installed mainly to stop, at emergency, the flow of a working medium to be introduced into the turbine 610. The regulator valve V602 is installed mainly to regulate the flow rate of the working medium to be introduced into the turbine 610.

[B] Configuration of a Hydraulic Drive Valve Device 1

FIG. 2A to FIG. 2D are diagrams illustrating a hydraulic drive valve device 1 according to the first embodiment.

The hydraulic drive valve device 1 is, for example, the stop valve V601 (see FIG. 1), and includes a valve body part 10 and a valve drive part 20 as illustrated in FIG. 2A to FIG. 2D. The hydraulic drive valve device 1 may be used, for example, as the regulator valve V602 (see FIG. 1).

Figure 2A:
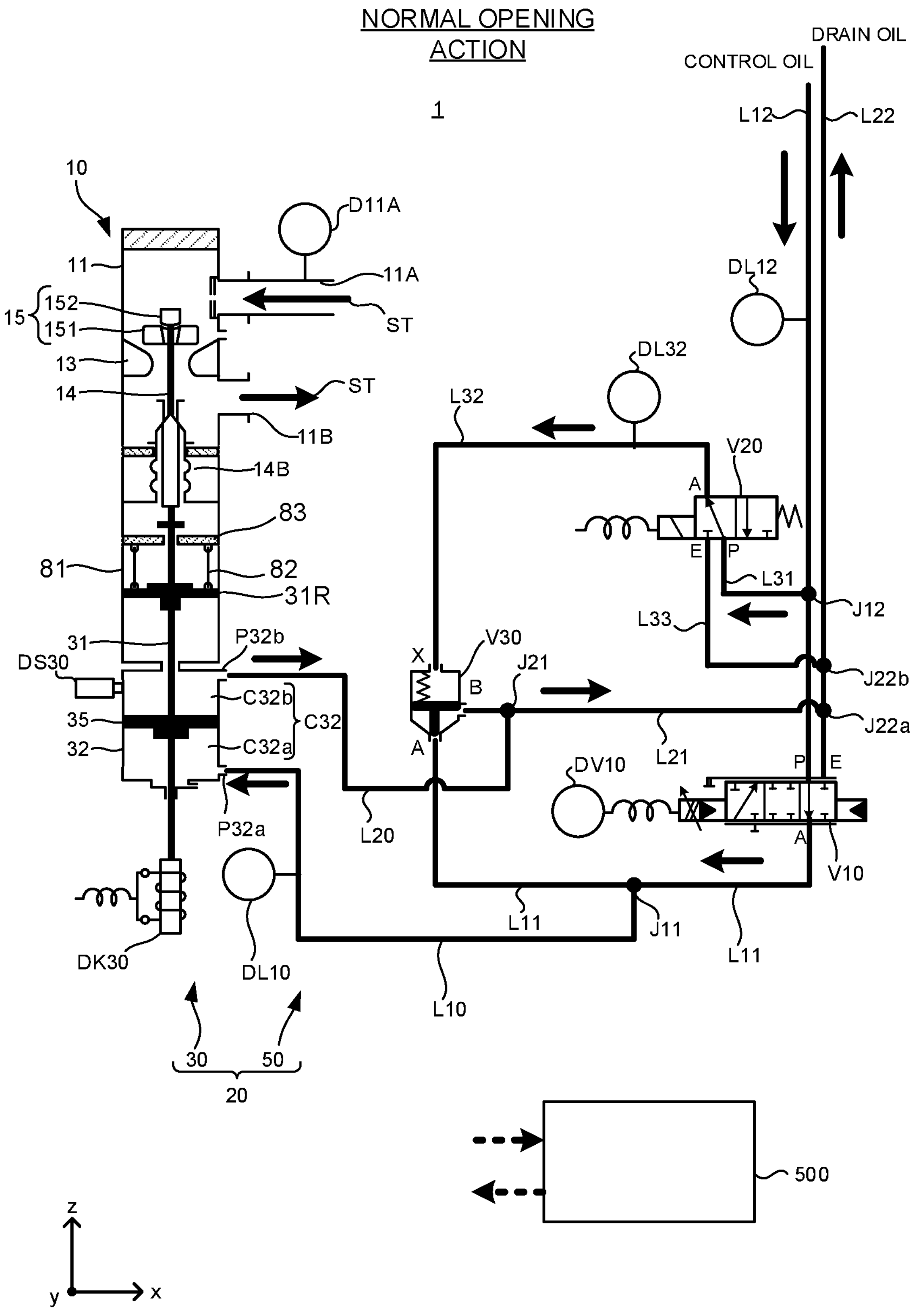
FIG. 2A is a diagram illustrating a hydraulic drive valve device 1 according to the first embodiment (opening action).
Figure 2B:
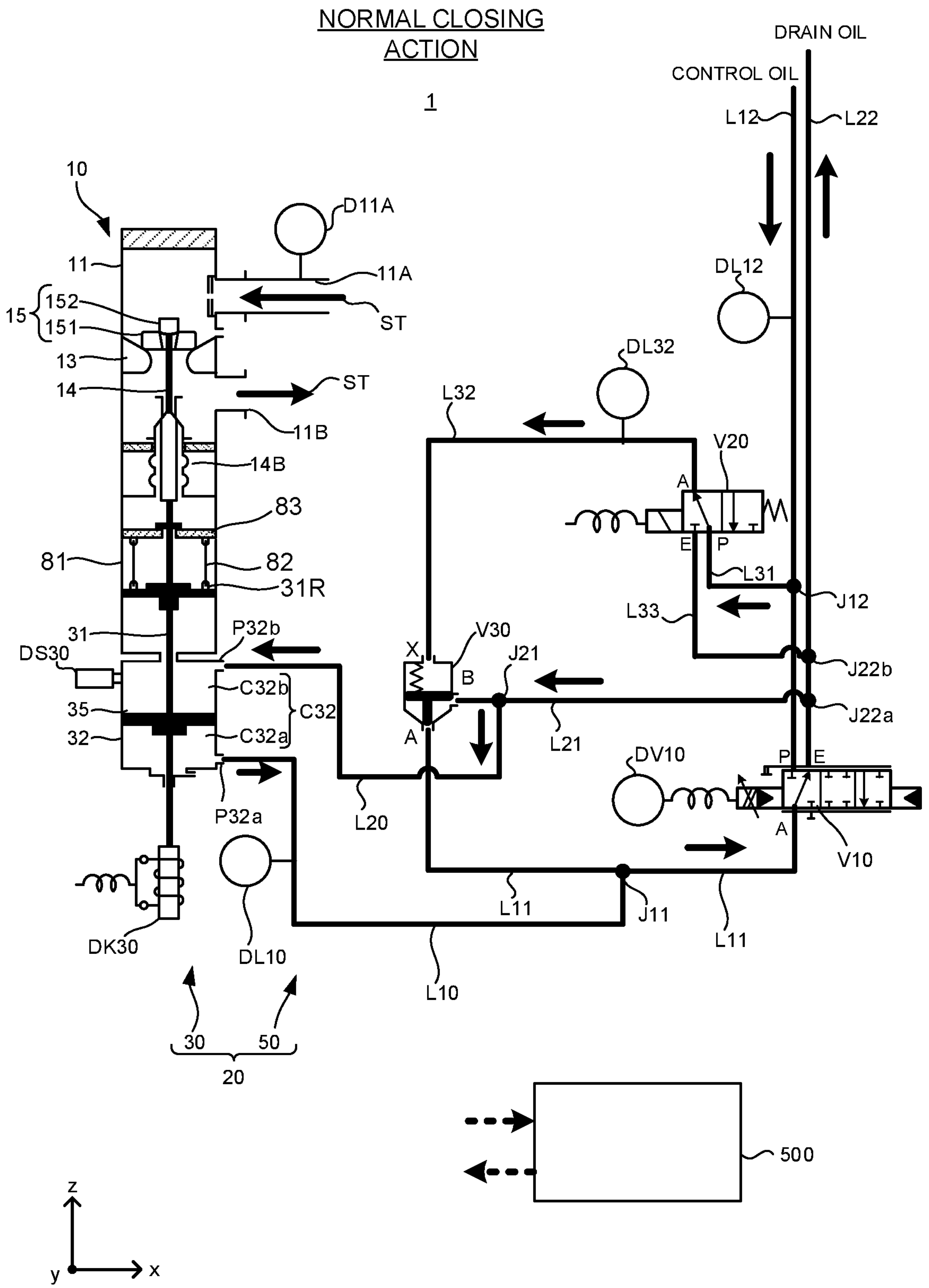
FIG. 2B is a diagram illustrating the hydraulic drive valve device 1 according to the first embodiment (closing action).
Figure 2C:
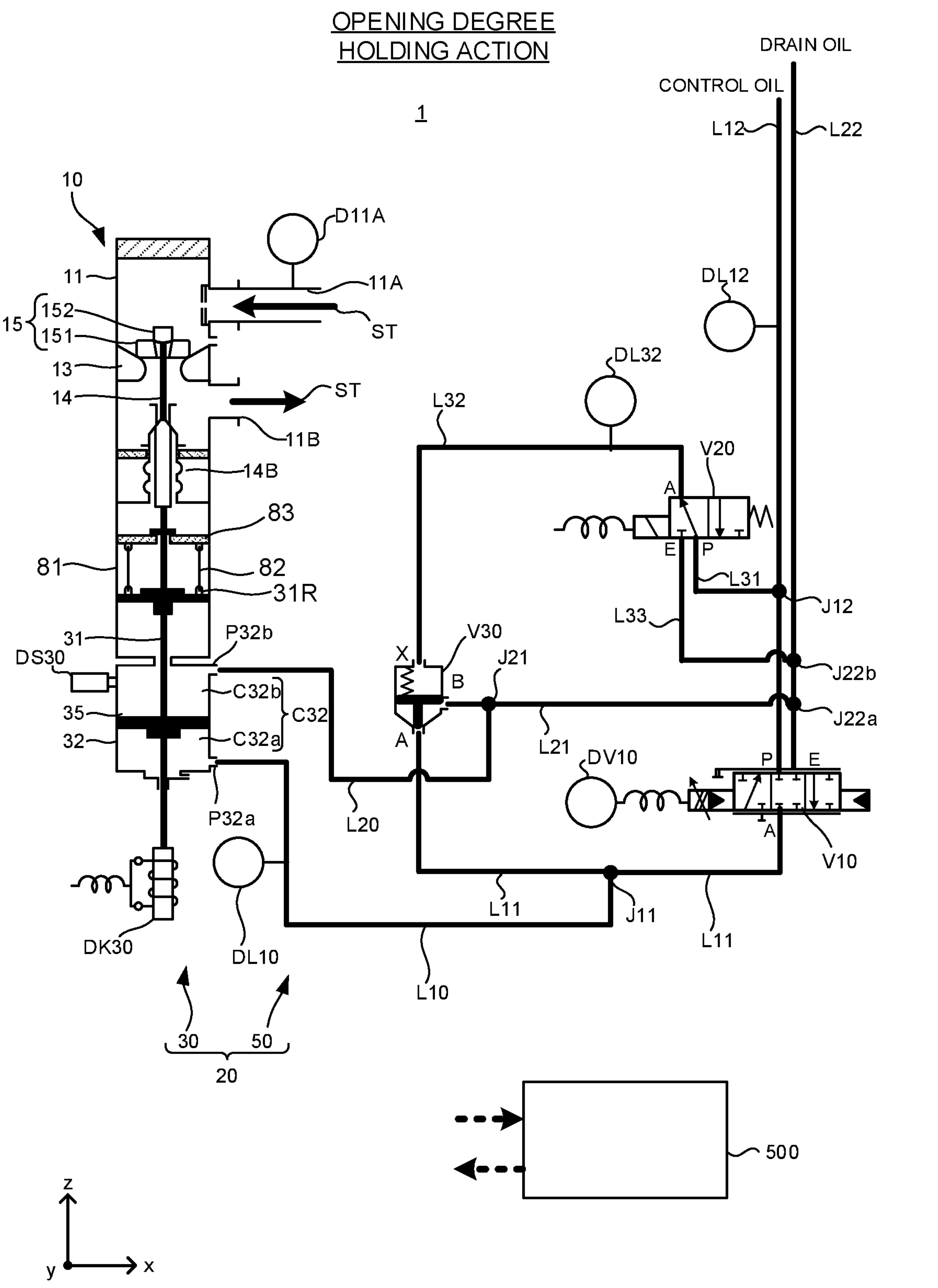
FIG. 2C is a diagram illustrating the hydraulic drive valve device 1 according to the first embodiment (holding action).
Figure 2D:
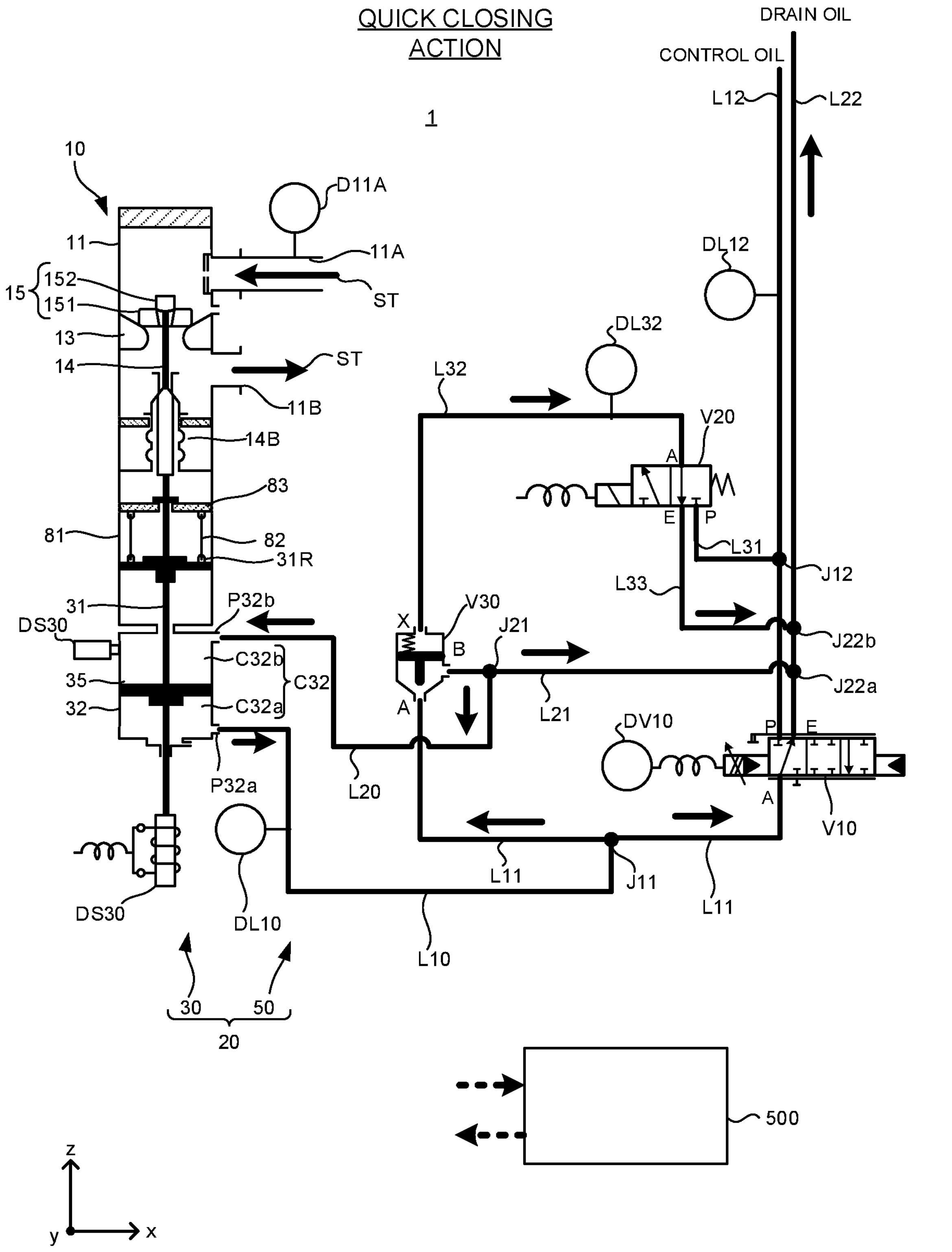
FIG. 2D is a diagram illustrating the hydraulic drive valve device 1 according to the first embodiment (quick closing action).

FIG. 2A to FIG. 2D schematically illustrate a cross section, of the valve body part 10, in a vertical plane (xz plane) along a vertical direction z. Here, FIG. 2A illustrates an appearance where the valve drive part 20 performs a normal opening action of the valve body part 10. FIG. 2B illustrates an appearance where the valve drive part 20 performs a normal closing action of the valve body part 10. FIG. 2C illustrates an appearance where the valve drive part 20 does not perform the normal closing action nor the normal opening action of the valve body part 10 but performs an opening degree holding action. FIG. 2D illustrates an appearance where the valve drive part 20 performs a quick closing action of closing the valve body part 10 more quickly than the normal closing action.

Details of components constituting the hydraulic drive valve device 1 will be explained in sequence.

[B-1] Valve Body Part 10

The valve body part 10 has a valve box 11, a valve seat 13, a valve rod 14, and a valve element 15, and is configured to vary in opening degree by the movement of the valve rod 14 by the valve drive part 20. The valve body part 10 is installed in the flow path of the working fluid ST (for example, steam) to be supplied from the boiler (not illustrated) to the turbine (not illustrated) in the turbine plant (not illustrated), and is provided to control the flow of the working fluid ST.

[B-1-1] Valve Box 11

The valve box 11 is formed with a valve box inlet 11A through which the working fluid ST flows from the outside to the inside, and a valve box outlet 11B through which the working fluid ST flows from the inside to the outside.

[B-1-2] Valve Seat 13

The valve seat 13 is fixed to the inside of the valve box 11. The valve seat 13 is configured to include a portion from which the valve element 15 is separated when the valve body part 10 is opened and with which the valve element 15 comes into contact when the valve body part 10 is closed.

[B-1-3] Valve Rod 14

The valve rod 14 is a rod-shaped body and is installed to penetrate through a through hole formed at a lower portion of the valve box 11. The through hole of the valve box 11 is provided with a tubular bush 14B, and the valve rod 14 penetrates through the through hole of the valve box 11 via the bush 14B. The valve rod 14 has an axis along the vertical direction z, and is provided so as to move in the vertical direction z along which the axis extends.

[B-1-4] Valve Element 15

The valve element 15 is provided at one end (upper end in the drawing) of the valve rod 14 inside the valve box 11, and moves together with the valve rod 14 in the vertical direction z. The valve element 15 moves upward when the valve body part 10 is opened. In contrast, the valve element 15 moves downward when the valve body part 10 is closed.

In this embodiment, the valve element 15 includes a parent valve element 151 and a child valve element 152.

The parent valve element 151 is slidably provided at the valve rod 14 inside the valve box 11, and is configured to come, when being in a fully-closed state, into contact with the valve seat 13. The child valve element 152 is fixed to the valve rod 14 inside the valve box 11, and is configured to come, when being in a fully-closed state, into contact with the parent valve element 151.

Here, the child valve element 152 starts to open when the parent valve element 151 is in a fully-closed state, and the parent valve element 151 starts to open when the child valve element 152 becomes a fully-open state. When the valve body part 10 in a fully-closed state, both the child valve element 152 and the parent valve element 151 are in a fully-closed state. When the valve body part 10 in a fully-open state, both the child valve element 152 and the parent valve element 151 are in a fully-open state.

[B-2] Valve Drive Part 20

The valve drive part 20 includes a hydraulic drive part 30 and a hydraulic circuit part 50, and is configured such that the hydraulic drive part 30 is driven by the hydraulic circuit part 50 to perform the opening/closing action of the valve body part 10. In the valve drive part 20, a control device (not illustrated) controls the action of the hydraulic circuit part 50 to control the action of the hydraulic drive part 30.

[B-2-1] Hydraulic Drive Part 30

In the valve drive part 20, the hydraulic drive part 30 is a hydraulic drive device and is installed below the valve body part 10 in the vertical direction z. In the hydraulic drive part 30, an operation rod 31 which operates the valve body part 10 is provided with a piston 35, and the piston 35 is housed in an oil cylinder 32. The hydraulic drive part 30 is configured such that the piston 35 is driven by the action of control oil inside the oil cylinder 32 to cause the operation rod 31 to operate the valve body part 10.

[B-2-1-1] Operation Rod 31

The operation rod 31 of the hydraulic drive part 30 is a rod-shaped body and has an axis along the vertical direction z. The operation rod 31 is coaxial with the axis of the valve rod 14 and has one end (upper end) coupled to the valve rod 14. The operation rod 31 is provided with an opening degree detector DK30 at the other end (lower end). The operation rod 31 is further provided with the piston 35 at a middle portion.

[B-2-1-2] Oil Cylinder 32

The oil cylinder 32 of the hydraulic drive part 30 houses the piston 35 in an internal space C32. The internal space C32 of the oil cylinder 32 is divided by the piston into a first hydraulic chamber C32$a$ and a second hydraulic chamber C32$b$. Further, the oil cylinder 32 is formed with a first control oil port P32$a$ and a second control oil port P32$b$.

The first hydraulic chamber C32$a$ is a lower hydraulic chamber and is located below the piston 35 in the internal space C32 of the oil cylinder 32. The first hydraulic chamber C32$a$ is provided with the first control oil port P32$a$.

The second hydraulic chamber C32$b$ is an upper hydraulic chamber and is located above the piston 35 in the internal space C32 of the oil cylinder 32. The second hydraulic chamber C32b is provided with the second control oil port P32b.

[B-2-1-3] Piston 35

The piston 35 of the hydraulic drive part 30 is configured to slide in the vertical direction z by the action of the control oil in the internal space C32 of the oil cylinder 32.

Specifically, when opening the valve body part 10, the piston 35 is controlled by the hydraulic circuit part 50 so as to move upward in the vertical direction z. In this case, in the hydraulic circuit part 50, the control oil is supplied to the first hydraulic chamber C32a and the control oil is drained as a drain oil from the second hydraulic chamber C32b to move the piston 35 upward.

When closing the valve body part 10, the piston 35 is controlled by the hydraulic circuit part 50 so as to move downward in the vertical direction z. In this case, in the hydraulic circuit part 50, the control oil is drained as the drain oil from the first hydraulic chamber C32a and the control oil is supplied to the second hydraulic chamber C32b to move the piston 35 downward. When holding the opening degree of the valve body part 10, the pressure in the first hydraulic chamber C32a and the pressure in the second hydraulic chamber C32b are adjusted to bring the piston 35 into a state of stopping at the same position in the vertical direction z.

[B-2-1-4] Closing Spring 82

The hydraulic drive part 30 is further provided with a closing spring 82. The closing spring 82 is, for example, a coil spring made by winding a metal wire in a spiral form, and is housed in a spring box 81 installed between the valve box 11 and the oil cylinder 32 in the vertical direction z. The closing spring 82 is installed to penetrate the inside of the operation rod 31 in the vertical direction z. The closing spring 82 is configured to expand and contract by the operation rod 31 operated by the piston 35.

Here, to the operation rod 31, a spring bearing 31R is fixed. Above the spring bearing 31R, a fixed plate 83 is fixed to an inner peripheral surface of the spring box 81. The closing spring 82 is interposed between the spring bearing 31R and the fixed plate 83, and is deformed in the vertical direction z along the axis of the operation rod 31 due to the change of the position of the spring bearing 31R accompanying the movement of the operation rod 31. The closing spring 82 presses the spring bearing 31R downward to thereby urge the valve body part 10 in a closing direction.

[B-2-2] Hydraulic Circuit Part 50

The hydraulic circuit part 50 of the valve drive part 20 has an electromagnetic valve V10, a quick closing electromagnetic valve V20, and a dump valve V30, and components are connected through a plurality of oil passages L10, L11, L12, L13, L20, L21, L22, L31, L32, L33.

Though details will be explained later, the hydraulic circuit part 50 is configured to perform the normal opening action (FIG. 2A), the normal closing action (FIG. 2B), and the opening degree holding action (FIG. 2C) of the valve body part 10 using the electromagnetic valve V10. The hydraulic circuit part 50 is further configured to perform the quick closing action (FIG. 2D) of closing the valve body part 10 more quickly than the normal closing action using the quick closing electromagnetic valve V20 and the dump valve V30.

[B-2-2-1] Oil Passage

The oil passage L10 has one end connected to the first control oil port P32a of the oil cylinder 32.

The oil passage L11 has one end connected to an A port of the dump valve V30 and the other end connected to an A port of the electromagnetic valve V10. The oil passage L11 is provided with a branch part J11, and the other end of the oil passage L10 is connected to the branch part J11.

The oil passage L12 has one end connected to a P port of the electromagnetic valve V10 and the other end connected to a supply source (not illustrated) of the control oil. The oil passage L12 is provided with a branch part J12.

The oil passage L20 has one end connected to the second control oil port P32b of the oil cylinder 32.

The oil passage L21 has one end connected to a B port of the dump valve V30. The oil passage L21 is provided with a branch part J21, and the other end of the oil passage L20 is connected to the branch part J21.

The oil passage L22 has one end connected to an E port of the electromagnetic valve V10 and the other end connected to a drain destination (not illustrated) of the drain oil. The oil passage L22 is provided with a branch part J22a and a branch part J22b in order from the electromagnetic valve V10 side toward the drain destination side of the drain oil. To the branch part J22a, the other end of the oil passage L21 is connected.

The oil passage L31 has one end connected to the branch part J12 of the oil passage L12 and the other end connected to a P port of the quick closing electromagnetic valve V20.

The oil passage L32 has one end connected to a pilot port X of the dump valve V30 and the other end connected to an A port of the quick closing electromagnetic valve V20.

The oil passage L33 has one end connected to the branch part J22b of the oil passage L22 and the other end connected to an E port of the quick closing electromagnetic valve V20.

[B-2-2-2] Electromagnetic Valve V10

The electromagnetic valve V10 of the hydraulic circuit part 50 is a servo valve and operates based on a control signal (servo current) output from the control device (not illustrated).

Here, when performing the normal opening action of the valve body part 10, the electromagnetic valve V10 makes the P port and the A port communicate with each other as illustrated in FIG. 2A. In other words, the electromagnetic valve V10 operates so as to make the first hydraulic chamber C32a and the supply source (not illustrated) of the control oil communicate with each other to supply the control oil to the first hydraulic chamber C32a.

In contrast, when performing the normal closing action of the valve body part 10, the electromagnetic valve V10 makes the A port and the E port communicate with each other as illustrated in FIG. 2B. In other words, the electromagnetic valve V10 operates so as to make the first hydraulic chamber C32a and the drain destination (not illustrated) of the drain oil communicate with each other to drain the control oil as the drain oil from the first hydraulic chamber C32a.

Also when performing the quick closing action of the valve body part 10, the electromagnetic valve V10 makes the A port and the E port communicate with each other as illustrated in FIG. 2D as in the case of performing the normal closing action.

In the case of performing the holding action of holding the opening degree of the valve body part 10, as illustrated in FIG. 2C, the electromagnetic valve V10 shuts the communication between the P port and the A port and shuts the communication between the A port and the E port. In other words, the electromagnetic valve V10 operates so as to shut off the first hydraulic chamber C32a from the supply source (not illustrated) of the control oil and shuts off the first hydraulic chamber C32a from the drain destination (not illustrated) of the drain oil.

[B-2-2-3] Quick Closing Electromagnetic Valve V20

The quick closing electromagnetic valve V20 of the hydraulic circuit part 50 is a trip valve and operates based on a control signal output from the control device (not illustrated).

Here, when performing the normal opening action, the normal closing action, and the holding action of holding the opening degree of the valve body part 10, the quick closing electromagnetic valve V20 is in an excited state as illustrated in FIG. 2A, FIG. 2B, and FIG. 2C to make the P port and the A port communicate with each other. In other words, the pilot port X of the dump valve V30 and the supply source (not illustrated) of the control oil are made to communicate with each other, and the control oil is supplied to the pilot port X of the dump valve V30, thereby closing the dump valve V30.

In contrast, when performing the quick closing action of the valve body part 10, as illustrated in FIG. 2D, the quick closing electromagnetic valve V20 becomes a non-excited state to make the A port and the E port communicate with each other. In other words, the pilot port X of the dump valve V30 and the drain destination (not illustrated) of the drain oil are made to communicate with each other, and the drain oil is drained from the pilot port X of the dump valve V30, thereby opening the dump valve V30.

[B-2-2-4] Dump Valve V30

The dump valve V30 of the hydraulic circuit part 50 is configured to perform the opening/closing action according to the action of the quick closing electromagnetic valve V20 as explained above.

[B-3] Detector

In the hydraulic drive valve device 1 in this embodiment, a pressure detector D11A, an opening degree detector DK30, a vibration detector DS30, a servo current detector DV10, a hydraulic pressure detector DL10, a hydraulic pressure detector DL12, and a hydraulic pressure detector DL32 are installed as detectors.

[B-3-1] Pressure Detector D11A

The pressure detector D11A is installed at the valve box inlet 11A of the valve box 11 constituting the valve body part 10 in order to measure the pressure of the working fluid ST flowing into the valve body part 10.

[B-3-2] Opening Degree Detector DK30

The opening degree detector DK30 is installed at the other end (lower end) of the operation rod 31 in order to detect the opening degree of the valve body part 10.

[B-3-3] Vibration Detector DS30

The vibration detector DS30 is installed at the oil cylinder 32 in order to detect the vibration of the valve rod 14 constituting the valve body part 10.

[B-3-4] Servo Current Detector DV10

The servo current detector DV10 is installed at the electromagnetic valve V10 in order to detect the servo current input as the control signal into the electromagnetic valve V10 being the servo valve.

[B-3-5] Hydraulic Pressure Detector DL10

The hydraulic pressure detector DL10 (oil cylinder hydraulic pressure detector) is, for example, a pressure transmitter, and is installed at the oil passage L10 in order to measure the pressure of the control oil applied to the first hydraulic chamber C32*a*.

[B-3-6] Hydraulic Pressure Detector DL12

The hydraulic pressure detector DL12 is, for example, a pressure transmitter and is installed at the oil passage L12 in order to measure the pressure of the control oil supplied from the supply source (not illustrated) of the control oil.

[B-3-7] Hydraulic Pressure Detector DL32

The hydraulic pressure detector DL32 (trip system hydraulic pressure detector) is, for example, a pressure transmitter, and is installed at the oil passage L32 in order to measure the pressure of the control oil applied to the pilot port X of the dump valve V30.

[C] Configuration of a Hydraulic Drive Valve Monitoring Device 500

As illustrated in FIG. 2A to FIG. 2D, in this embodiment, a hydraulic drive valve monitoring device 500 is provided to monitor the hydraulic drive valve device 1.

Figure 3:
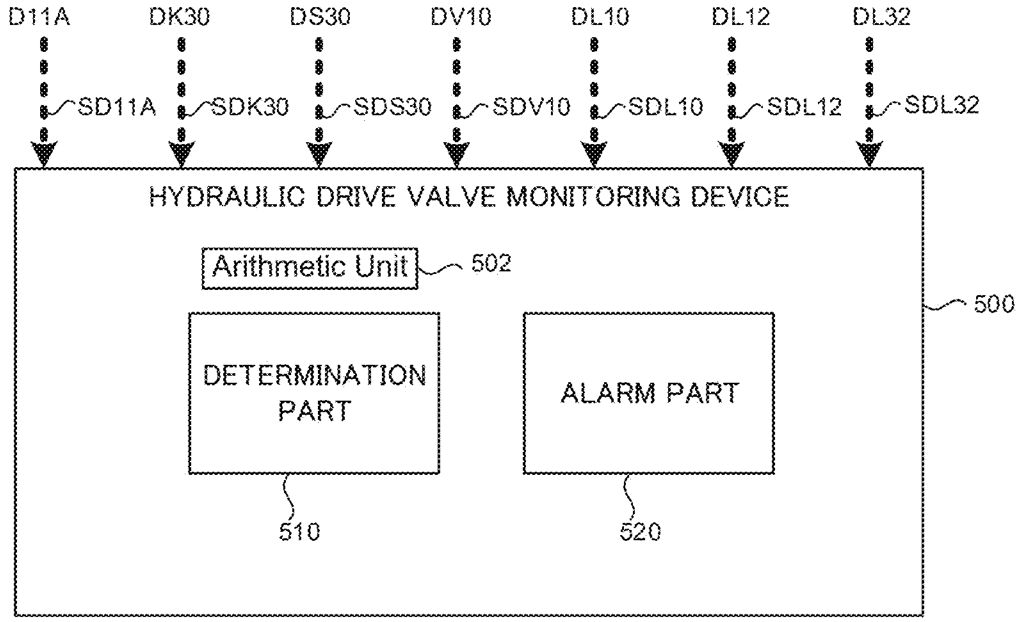
FIG. 3 is a functional block diagram illustrating a hydraulic drive valve monitoring device 500 according to the first embodiment.

FIG. 3 is a functional block diagram illustrating the hydraulic drive valve monitoring device 500 according to the first embodiment.

As illustrated in FIG. 3, the hydraulic drive valve monitoring device 500 in this embodiment has a determination part 510 and an alarm part 520, and is configured to monitor the hydraulic drive valve device 1 (see FIG. 2A to FIG. 2D) including the valve body part 10 and the valve drive part 20. The hydraulic drive valve monitoring device 500 includes an arithmetic unit 502 and a memory device (not illustrated), and is configured such that the arithmetic unit performs arithmetic processing using a program stored in the memory device to cause components to operate.

The hydraulic drive valve monitoring device 500 is further configured to receive detection data output from the detectors provided in the hydraulic drive valve device 1 (see FIG. 2A to FIG. 2D). Specifically, the hydraulic drive valve monitoring device 500 receives, as illustrated in FIG. 3, detection data SD11A output from the pressure detector D11A, detection data SDK30 output from the opening degree detector DK30, detection data SDS30 output from the vibration detector DS30, detection data SDV10 output from the servo current detector DV10, detection data SDL10 output from the hydraulic pressure detector DL10, detection data SDL12 output from the hydraulic pressure detector DL12, and detection data SDL32 output from the hydraulic pressure detector DL32. The detection data received by the hydraulic drive valve monitoring device 500 is stored in association with a time axis.

Components constituting the hydraulic drive valve monitoring device 500 in this embodiment will be explained.

[C-1] Determination Part 510

In the hydraulic drive valve monitoring device 500, the determination part 510 is configured to determine whether there is a sign of failure in the hydraulic drive valve device 1.

Figure 4:
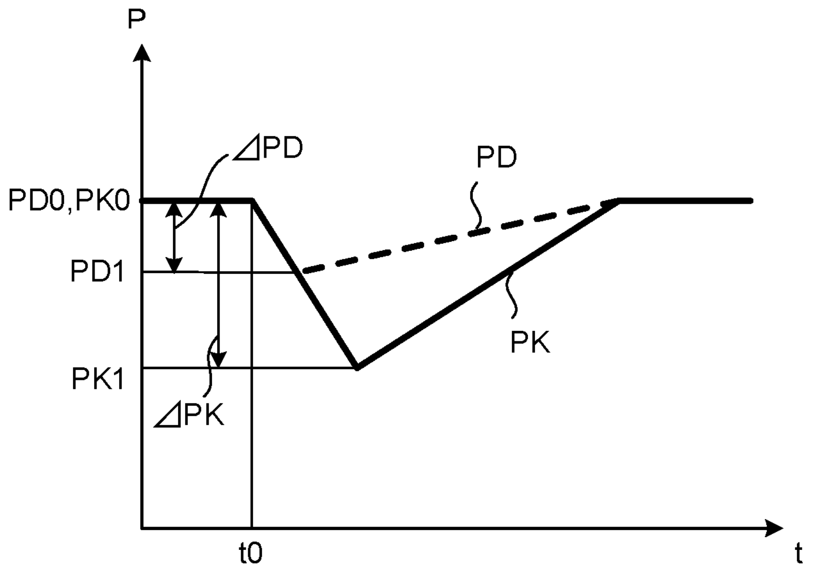
FIG. 4 is a chart for explaining a determination made by a determination part 510 in the hydraulic drive valve monitoring device 500 according to the first embodiment.

FIG. 4 is a chart for explaining the determination made by the determination part 510 in the hydraulic drive valve monitoring device 500 according to the first embodiment.

FIG. 4 illustrates a case where the valve body part 10 (see FIG. 2A) is increased in opening degree from the fully-closed state (namely, a case where the valve is started to open from a time point t0 in the fully-closed state). In FIG. 4, the vertical axis represents a working fluid pressure P and the horizontal axis represents a time t. Further, in FIG. 4, a broken line indicates a transition PD of a working fluid pressure measurement value obtained by measuring the pressure of the working fluid flowing into the valve body part 10, and a solid line indicates a transition PK of a working fluid pressure reference value set for the pressure of the working fluid flowing into the valve body part 10.

The transition PD (broken line) of the working fluid pressure measurement value corresponds to a transition of the detection data SD11A output by the pressure detector D11A measuring the working fluid pressure P when the opening degree of the valve body part 10 is increased from the fully-closed state (namely, when the valve is started to open), and indicates a state where there is an abnormality in the hydraulic drive valve device 1 in FIG. 4. The abnormality in the hydraulic drive valve device 1 is, for example, a case where leakage occurs at least one of the parent valve element 151 and the child valve element 152 constituting the valve element 15 of the valve body part 10, or the like.

The transition PK (solid line) of the working fluid pressure reference value corresponds to the transition of the working fluid pressure P when the opening degree of the valve body part 10 is increased from the fully-closed state in the case where there is no abnormality in the hydraulic drive valve device 1, and is stored in advance.

In the case where the hydraulic drive valve device 1 is in a normal state, the value of the working fluid pressure P decreases from PK0 to PK1 and then returns from PK1 to PK0 as is found from the transition PK (solid line) of the working fluid pressure reference value. In the case where the hydraulic drive valve device 1 is in a normal state, the value by which the working fluid pressure P varies is ΔPK (ΔPK=PK0−PK1). In the case where the hydraulic drive valve device 1 is in an abnormal state (for example, in the case where leakage occurs at the valve element 15 of the valve body part 10), the value by which the working fluid pressure P varies is ΔPD (ΔPD=PD0−PD1) as is found from the transition PD (broken line) of the working fluid pressure measurement value.

As is found from the comparison between the transition PD (broken line) of the working fluid pressure measurement value and the transition PK (solid line) of the working fluid pressure reference value in FIG. 4, the value by which the working fluid pressure P varies is smaller in the case where the hydraulic drive valve device 1 is in an abnormal state than in the case where the hydraulic drive valve device 1 is in a normal state (namely, ΔPD<ΔPK).

Therefore, the determination part 510 finds the value ΔPD by which the working fluid pressure P varies when the opening degree of the valve body part 10 is increased from the fully-closed state, from the transition PD (broken line) of the working fluid pressure measurement value, and determines whether there is a sign of failure in the hydraulic drive valve device 1, based on the value ΔPD. For example, the determination part 510 determines that there is a sign of failure in the hydraulic drive valve device 1 when a percentage value of ΔPD to ΔPK (PS=ΔPD/ΔPK) is smaller than a threshold Pth set in advance (PS<Pth). On the other hand, the determination part 510 determines that there is no sign of failure in the hydraulic drive valve device 1 and it is normal when the percentage value of ΔPD to ΔPK (PS=ΔPD/ΔPK) is equal to or greater than the threshold Pth set in advance (PS≥Pth).

[C-2] Alarm Part 520

In the hydraulic drive valve monitoring device 500, the alarm part 520 is configured to output an alarm when the determination part 510 determines that there is a sign of failure in the hydraulic drive valve device 1.

The alarm part 520 include, for example, a display and displays, on the display, an alarm that there is a sign of failure in the hydraulic drive valve device 1. In addition, the alarm part 520 may be configured to make an alarm, for example, by lighting of an alarm lamp, output of an alarm sound, or the like.

[D] Conclusion

As explained above, in the hydraulic drive valve monitoring device 500 in this embodiment, the determination part 510 determines whether there is a sign of failure in the hydraulic drive valve device 1. Here, the determination part 510 makes the above determination based on the result of the comparison between the transition PD of the working fluid pressure measurement value obtained by measuring the pressure of the working fluid flowing into the valve body part 10 and the transition PK of the working fluid pressure reference value set for the pressure of the working fluid flowing into the valve body part 10, when the opening degree of the valve body part 10 is changed. The alarm part 520 then outputs an alarm when the determination part 510 determines that there is a sign of failure in the hydraulic drive valve device 1.

Therefore, the hydraulic drive valve monitoring device 500 in this embodiment can easily grasp a sign of failure in the hydraulic drive valve device 1 and therefore can accurately prevent a decrease in operation rate of the turbine plant.

MODIFICATION EXAMPLES

Modification examples of this embodiment will be explained.

[E-1] Modification Example 1-1

The hydraulic drive valve monitoring device 500 in this embodiment may be configured to be able to change, according to the operation, the set value of the threshold Pth used when the determination part 510 makes the determination. This enables an operator of the turbine plant to adjust the detection sensitivity of the sign of failure as appropriate.

[E-2] Modification Example 1-2

Besides, the determination part 510 may be configured to supplementarily use, when making the above determination, the detection data SDS30 output from the vibration detector DS30. In the case where leakage occurs in the valve element 15 of the valve body part 10, the valve rod 14 may vibrate due to the leaked fluid. Therefore, by using also the detection data SDS30 output from the vibration detector DS30, the determination part 510 can more precisely determine the presence or absence of the occurrence of leakage.

[E-3] Modification Example 1-3

Figure 5:
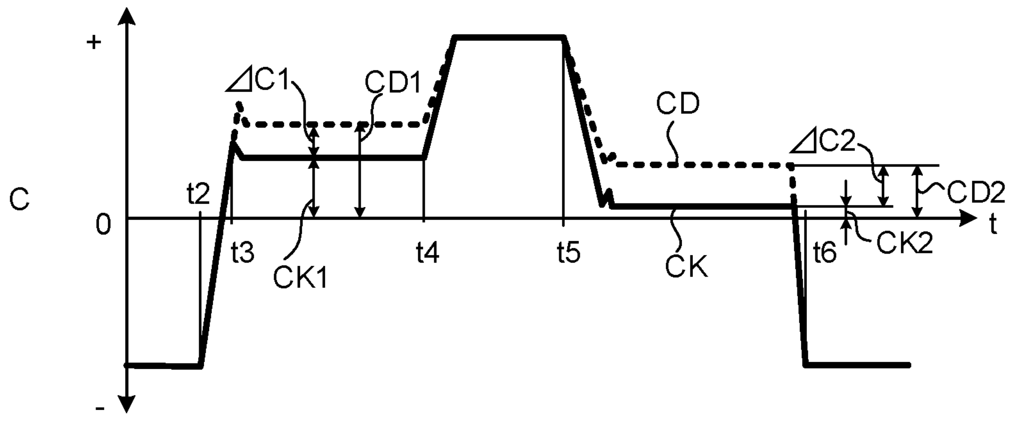
FIG. 5 is a chart for explaining the determination made by the determination part 510 in Modification Example 1-3 of the first embodiment.

FIG. 5 is a chart for explaining the determination made by the determination part 510 in Modification Example 1-3 of the first embodiment.

FIG. 5 illustrates a case of changing the valve body part 10 (see FIG. 2A) from the fully-closed state to the fully-open state (between t2 and t4) and then returning it from the fully-open state to the fully-closed state (between t5 and t6). In FIG. 5, the vertical axis represents a servo current value C (mA) input as a control signal to the electromagnetic valve V10 (servo valve), and the horizontal axis represents a time t. Further, in FIG. 5, a broken line indicates a transition CD of a servo current measurement value obtained by measuring the servo current input as a control signal into the electromagnetic valve V10 (servo valve), and a solid line indicates a transition CK of a servo current reference value set for the servo current input as a control signal into the electromagnetic valve V10 (servo valve).

The transition CD (broken line) of the servo current measurement value corresponds to a transition of the detection data SDV10 output by the servo current detector DV10 measuring the servo current value C when changing the valve body part 10 from the fully-closed state to the fully-open state and then returning it from the fully-open state to the fully-closed state, and indicates a state where there is an abnormality in the hydraulic drive valve device 1 in FIG. 5.

The transition CK (solid line) of the servo current reference value corresponds to the transition of the servo current value C when changing the valve body part 10 from the fully-closed state to the fully-open state and then returning it from the fully-open state to the fully-closed state in the case where there is no abnormality in the hydraulic drive valve device 1, and is stored in advance.

In the case where the hydraulic drive valve device 1 is in a normal state, the servo current value C increases in a manner to cancel a null bias at and after a time point t2 when a command of bringing the valve body part 10 in the fully-closed state into the fully-open state is input, as is found from the transition CK (solid line) of the servo current reference value. The null bias is a bias applied to control the valve body part 10 to a failsafe side (fully-closed state direction) when the servo current is lost. Then, at and after a time point t3 when the null bias is canceled, a fixed servo current value C is held, and the valve body part 10 in the fully-closed state opens at a fixed speed into the fully-open state. Then, at and after a time point t4 when the valve body part 10 becomes the fully-open stat, the servo current value C increases to a maximum value, and the valve body part 10 holds the fully-open state.

Then, at and after a time point t5 when a command of bringing the valve body part 10 in the fully-open state into the fully-closed state is input, the servo current value C decreases to start the closing action of the valve body part 10. Then, at and after a time point t6 when the valve body part 10 becomes the fully-closed state, the servo current value C returns to the original value.

As is found from the transition CK (solid line) of the servo current reference value, in the case where the hydraulic drive valve device 1 is in a normal state, the servo current value C when bringing the valve body part 10 in the fully-closed state into the fully-open state is CK1 and the servo current value C when bringing the valve body part 10 in the fully-open state into the fully-closed state is CK2.

In contrast, in the case where there is an abnormality in the hydraulic drive valve device 1, the servo current value C when bringing the valve body part 10 in the fully-closed state into the fully-open state is CD1 greater than a normal value CK1 ($CK1<CD1$) as is found from the transition CD (broken line) of the servo current measurement value. The servo current value C when bringing the valve body part 10 in the fully-open state into the fully-closed state is a value CD2 greater than a normal value CK2 ($CK2<CD2$).

Therefore, the determination part 510 determines whether there is a sign of failure in the hydraulic drive valve device 1 based on the transition CD (broken line) of the servo current measurement value. For example, the determination part 510 determines that there is a sign of failure in the hydraulic drive valve device 1 when a difference value $\Delta C1$ ($\Delta C1=CD1-CK1$) between the value CD1 obtained by measuring the servo current value C when bringing the valve body part 10 in the fully-closed state into the fully-open state and the normal value CK1 is greater than a threshold Cth1 set in advance ($\Delta C1>Cth1$). Similarly, the determination part 510 determines that there is a sign of failure in the hydraulic drive valve device 1 when a difference value $\Delta C2$ ($\Delta C2=CD2-CK2$) between the value CD2 obtained by measuring the servo current value C when bringing the valve body part 10 in the fully-open state into the fully-closed state and the normal value CK2 is greater than a threshold Cth2 set in advance ($\Delta C2>Cth2$).

As explained above, in this modification example, the determination part 510 determines whether there is a sign of failure in the hydraulic drive valve device 1 based on the result of the comparison between the transition of the servo current measurement value obtained by measuring the servo current input into the electromagnetic valve V10 and the transition of the servo current reference value set for the servo current input into the electromagnetic valve V10, when changing the opening degree of the valve body part 10. Then, when the determination part 510 determines that there is a sign of failure in the hydraulic drive valve device 1, the alarm part 520 outputs an alarm. Therefore, according to this modification example, it is possible to easily grasp a sign of failure in the hydraulic drive valve device 1 and therefore possible to accurately prevent a decrease in operation rate of the turbine plant as in the above embodiment.

Note that in addition to the above, the determination part 510 may be configured to determine whether there is a sign of failure in the hydraulic drive valve device 1 based on the result of comparison between the relation between an opening degree measurement value obtained by measuring the opening degree of the valve body part 10 and a control oil pressure measurement value obtained by measuring the pressure of the control oil in the first hydraulic chamber C32*a*, and, the relation between an opening degree reference value set for the opening degree of the valve body part 10 and the control oil pressure reference value set for the pressure of the control oil in the first hydraulic chamber C32*a*.

Second Embodiment

[A] Configuration

Figure 6:
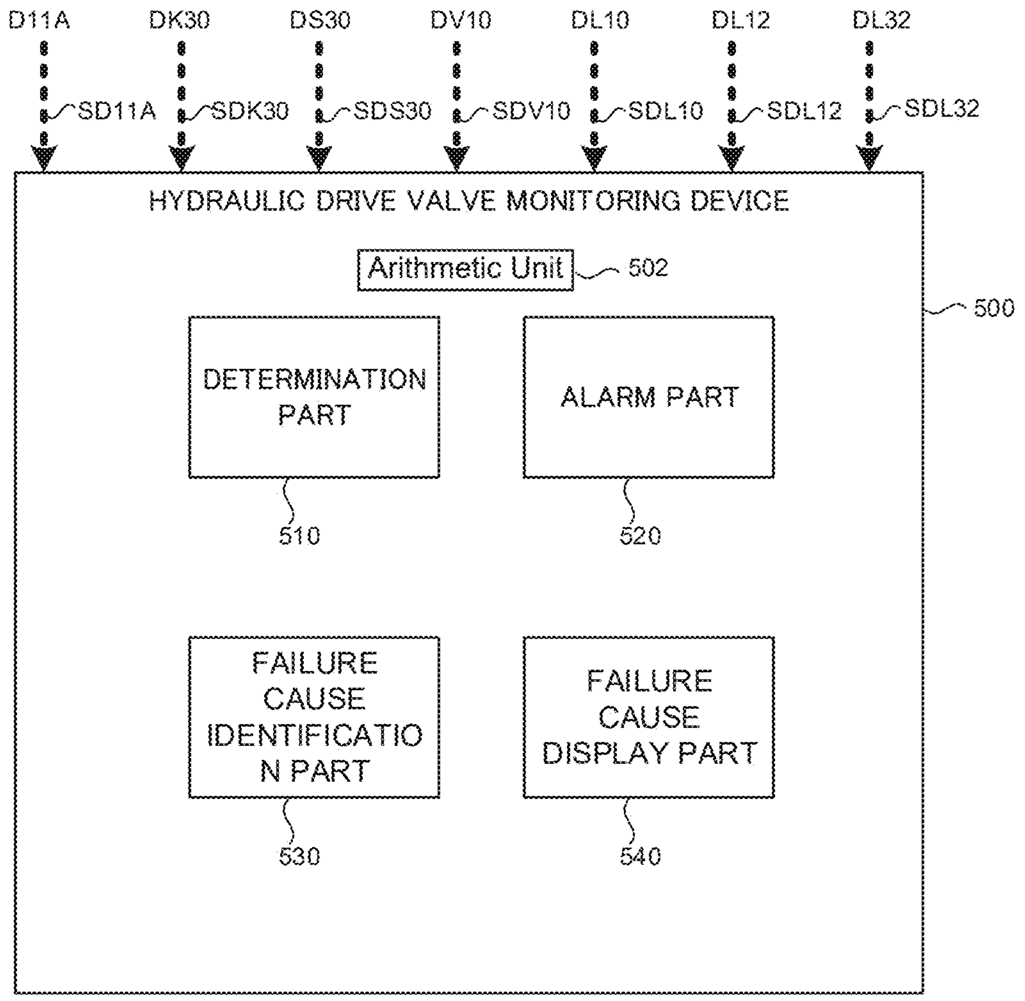
FIG. 6 is a functional block diagram illustrating a hydraulic drive valve monitoring device 500 according to a second embodiment.

FIG. 6 is a functional block diagram illustrating a hydraulic drive valve monitoring device 500 according to a second embodiment.

As illustrated in FIG. 6, the hydraulic drive valve monitoring device 500 in this embodiment further has a failure cause identification part 530 and a failure cause display part 540 unlike the case of the first embodiment (see FIG. 3). This embodiment is similar to the first embodiment except for this point and related points. Therefore, explanation of duplicated items is omitted as appropriate.

[A-1] Determination Part 510

In this embodiment, the determination part 510 is configured to determine whether there is a sign of failure in the hydraulic drive valve device 1 based on a pressure PX of the control oil applied to the first hydraulic chamber C32*a* when starting to open the valve body part 10, in addition to the result of the comparison between the transition of the working fluid pressure measurement value obtained by measuring the pressure of the working fluid flowing into the valve body part 10 and the transition of the working fluid pressure reference value set for the pressure of the working fluid flowing into the valve body part 10, when the opening degree of the valve body part 10 is changed.

Specifically, the determination part 510 determines that there is a sign of failure when the pressure PX of the control oil applied to the first hydraulic chamber C32*a* when starting to open the valve body part 10 is lower than a correct value (threshold PXth) set in advance ($PX<PXth$). However, because not only the pressure of the control oil but also a plurality of causes may exist, the failure cause identification part 530 explained below identifies a failure cause depending on whether a value by which the working fluid pressure measurement value varies is a correct value.

[A-2] Failure Cause Identification Part 530

The failure cause identification part 530 is configured to identify, when the determination part 510 determines that there is a sign of failure in the hydraulic drive valve device 1, the cause of the failure determined by the determination part 510.

Here, the failure cause identification part 530 stores a lookup table in which, for example, the contents of detection data when it is determined that there is a sign of failure in the hydraulic drive valve device 1 is associated with the cause of the abnormality in the hydraulic drive valve device 1, and identifies the cause of the failure from the detection data using the lookup table.

For example, in the case where the detection data SDL10 obtained by the hydraulic pressure detector DL10 (oil cylinder hydraulic pressure detector) measuring the pressure of the control oil applied to the first hydraulic chamber C32*a* when starting to open the valve body part 10 is lower than the correct value (first correct value PXth) (PX<PXth), and (A) when the value ΔPD (see FIG. 4) by which the working fluid pressure measurement value P varies is a correct value (second correct value), a decrease in spring force of the closing spring 82 is identified as the cause of the failure, and (B) when the value ΔPD (see FIG. 4) by which the working fluid pressure measurement value P varies is lower than the correct value (second correct value), the child valve element 152 is identified as having the cause of the failure.

Further, if the difference value ΔC1 between the value CD1 obtained by measuring the servo current value C and the normal value CK1 is greater than the threshold Cth1 (see FIG. 5) even though the detection data SDL10 measured by the hydraulic pressure detector DL10 is the correct value when performing the opening action of the valve body part 10, the failure cause identification part 530 identifies that the electromagnetic valve V10 (servo valve) has the cause of the failure. Similarly, if the difference value ΔC2 between the value CD2 obtained by measuring the servo current value C and the normal value CK2 is greater than the threshold Cth2 (see FIG. 5) even though the detection data SDL10 measure by the hydraulic pressure detector DL10 is the correct value when performing the closing action of the valve body part 10, the failure cause identification part 530 identifies that the electromagnetic valve V10 (servo valve) has the cause of the failure.

[A-3] Failure Cause Display Part 540

The failure cause display part 540 is configured to display the cause of the failure identified by the failure cause identification part 530.

The failure cause display part 540 includes, for example, a display and displays, on the display, the cause of the failure identified by the failure cause identification part 530. Here, the display on which the failure cause display part 540 displays the cause of the failure may be the same as the display on which the alarm part 520 makes an alarm.

[D] Conclusion

As explained above, in the hydraulic drive valve monitoring device 500 in this embodiment, the failure cause identification part 530 identifies the cause of the failure determined by the determination part 510, and the failure cause display part 540 displays the cause of the failure identified by the failure cause identification part 530. Therefore, it is possible to easily grasp a sign of failure in this embodiment.

Third Embodiment

[A] Configuration

Figure 7:
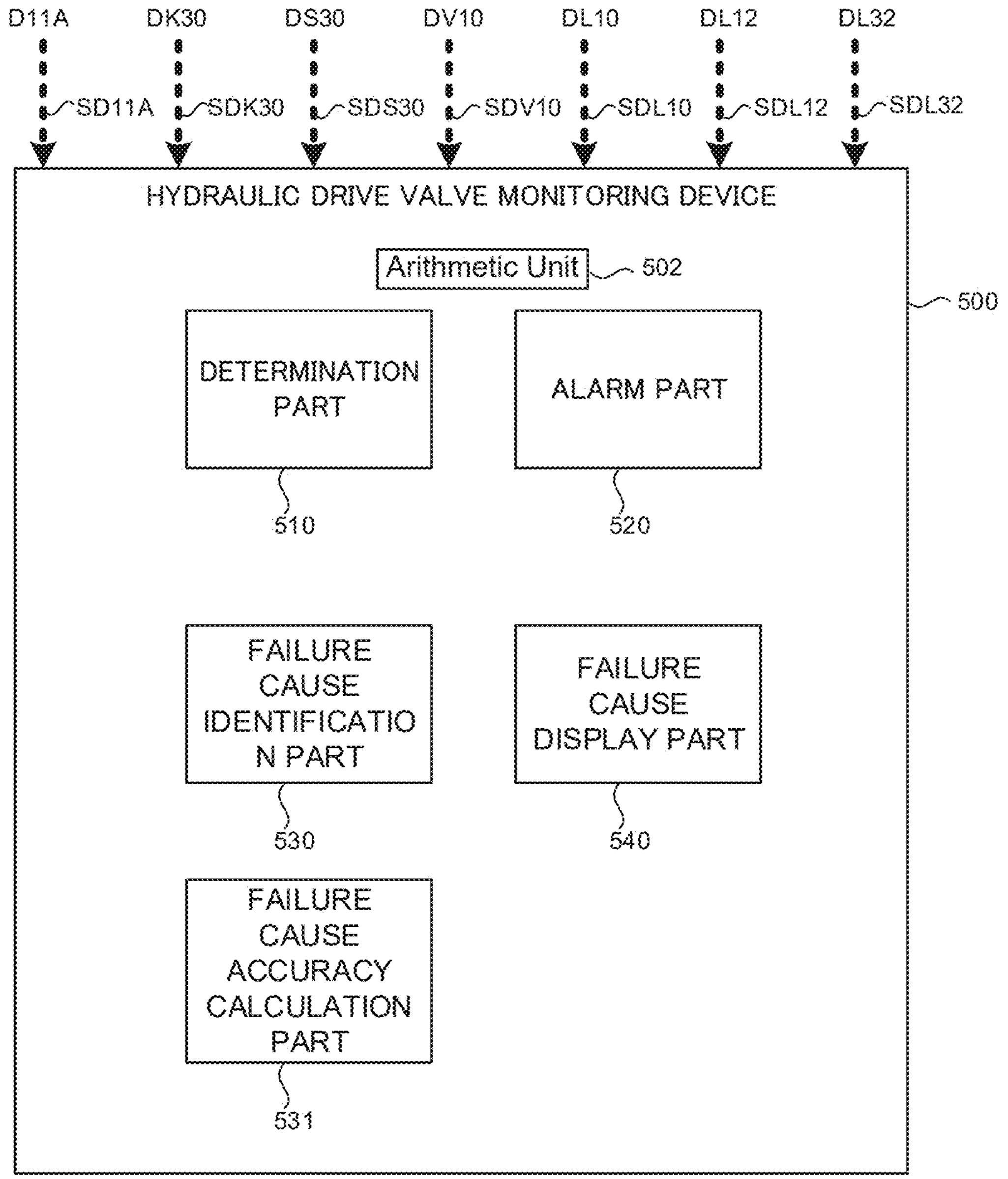
FIG. 7 is a functional block diagram illustrating a hydraulic drive valve monitoring device 500 according to a third embodiment.

FIG. 7 is a functional block diagram illustrating a hydraulic drive valve monitoring device 500 according to a third embodiment.

As illustrated in FIG. 7, the hydraulic drive valve monitoring device 500 in this embodiment further has a failure cause accuracy calculation part 531 unlike the second embodiment (see FIG. 6). This embodiment is similar to the second embodiment except for this point and related points. Therefore, explanation of duplicated items is omitted as appropriate.

The failure cause accuracy calculation part 531 is configured to find, when there are a plurality of causes of failure identified by the failure cause identification part 530, the accuracy (reliability) for each of the plurality of causes of failure.

Here, the failure cause accuracy calculation part 531 finds accuracy (reliability) based on a plurality of pieces of detection data. For example, when it is determined that there is a sign of a plurality of failures based on the plurality of pieces of detection data and causes of the plurality of failures overlap, the failure cause accuracy calculation part 531 calculates high accuracy (reliability) according to the number of the overlapping causes of failures.

Specifically, in the case where the cause of failure when it is determined that there is a sign of failure in the hydraulic drive valve device 1 based on the detection data SD11A output from the pressure detector D11A and the cause of failure when it is determined that there is a sign of failure in the hydraulic drive valve device 1 based on the detection data SDV10 output from the servo current detector DV10 overlap, the accuracies of the causes of overlapping failures become high.

Then, the failure cause display part 540 displays the plurality of causes of failures identified by the failure cause identification part 530 and the accuracies found by the failure cause accuracy calculation part 531 for the plurality of causes of failures.

[B] Conclusion

As explained above, in the hydraulic drive valve monitoring device 500 in this embodiment, the accuracy found for the cause of failure is displayed, so that it is possible to accurately prepare to deal with failure.

Fourth Embodiment

[A] Configuration

Figure 8:
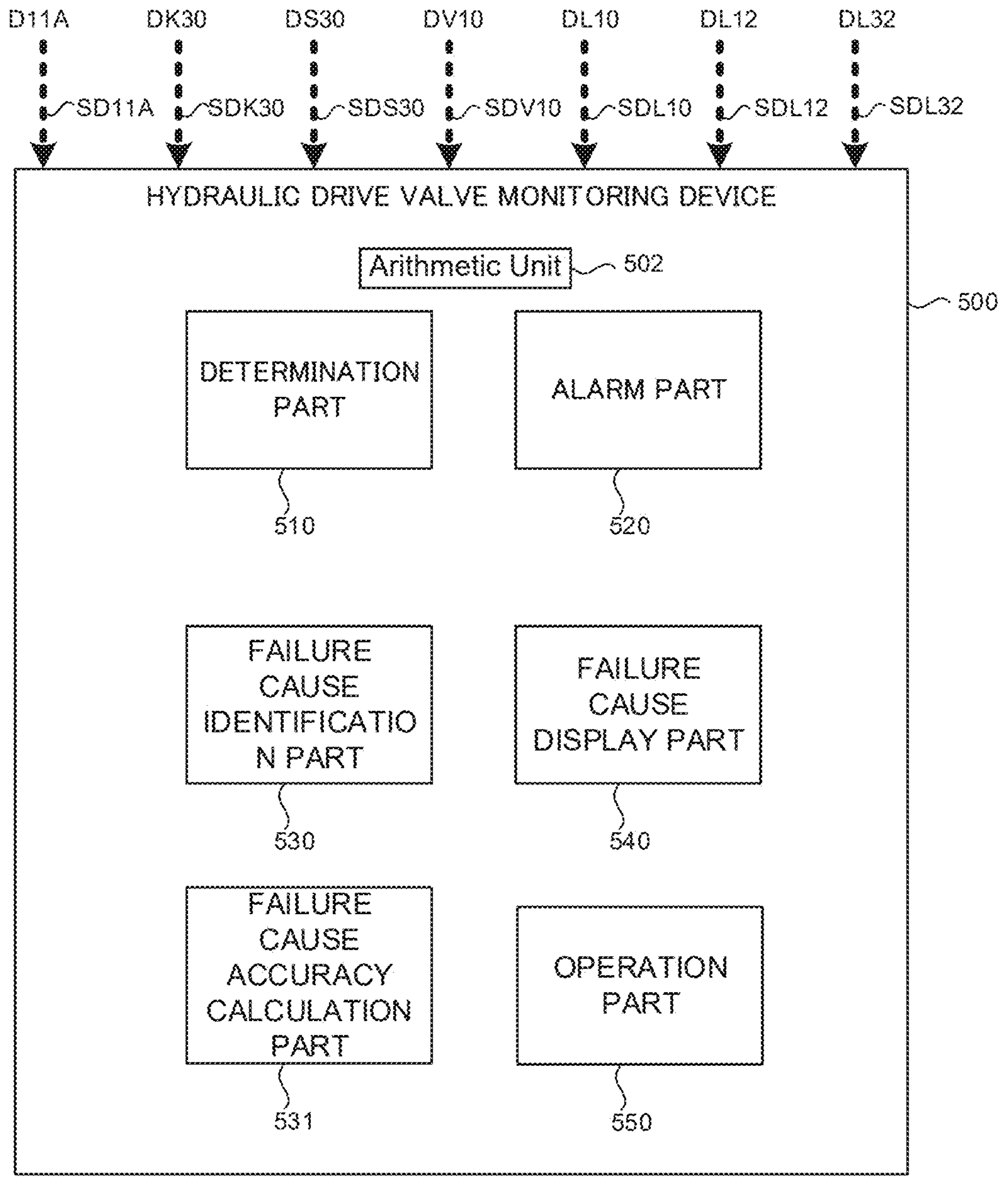
FIG. 8 is a functional block diagram illustrating a hydraulic drive valve monitoring device 500 according to a fourth embodiment.

FIG. 8 is a functional block diagram illustrating a hydraulic drive valve monitoring device 500 according to a fourth embodiment.

As illustrated in FIG. 8, the hydraulic drive valve monitoring device 500 in this embodiment further has an operation part 550 unlike the third embodiment (see FIG. 7). This embodiment is similar to the third embodiment except for this point and related points. Therefore, explanation of duplicated items is omitted as appropriate.

The operation part 550 is configured to operate the valve drive part 20 so that when the alarm part 520 outputs an alarm, the valve body part 10 alternates between the fully-open state and the fully-closed state.

Here, the operation part 550 causes the control device (not illustrated) to output a control signal (servo signal) to the electromagnetic valve V10, thereby making the valve body part 10 alternate between the fully-open state and the fully-closed state in a predetermined cycle. Note that the operation part 550 executes the above operation when the power generation output amount of the power generator 620 (see FIG. 1) constituting the turbine plant 600 is equal to or lower than a predetermined value and a range in which the pressure of the working fluid ST measured by the pressure detector D11A varies per unit time (one second) is equal to or lower than a predetermined value.

Then, when the valve body part 10 alternates between the fully-open state and the fully-closed state, processing that the determination part 510 determines whether there is a sign of failure and the failure cause identification part 530 identifies the cause of the failure, is executed.

[B] Conclusion

As explained above, in the hydraulic drive valve monitoring device 500 in this embodiment, the operation part 550 operates the valve drive part 20 so that when the alarm part 520 outputs an alarm, the valve body part 10 alternates between the fully-open state and the fully-closed state, to execute the determination of a sign of failure and the identification of the cause of failure. Therefore, it is possible to accurately grasp the failure in this embodiment.

Modification Example

Note that the operation part 550 may be configured to display, on the display, a command of recommending the execution of this operation before the execution of the operation of alternating the valve body part 10 between the fully-open state and the fully-closed state.

Others

While certain embodiments of the present invention have been described, these embodiments have been presented by way of example only, and are not intended to limit the scope of the inventions. These novel embodiments described herein may be embodied in a variety of other forms; furthermore, various omissions, substitutions and changes may be made therein without departing from the spirit of the inventions. The accompanying claims and their equivalents are intended to cover such forms or modifications as would fall within the scope and spirit of the inventions.

REFERENCE SIGNS LIST

1: hydraulic drive valve device, 10: valve body part, 11: valve box, 11A: valve box inlet, 11B: valve box outlet, 13: valve seat, 14: valve rod, 14B: bush, 15: valve element, 20: valve drive part, 30: hydraulic drive part, 31: operation rod, 31R: spring bearing, 32: oil cylinder, 35: piston, 50: hydraulic circuit part, 81: spring box, 82: closing spring, 83: fixed plate, 151: parent valve element, 152: child valve element, 500: hydraulic drive valve monitoring device, 510: determination part, 520: alarm part, 530: failure cause identification part, 531: failure cause accuracy calculation part, 540: failure cause display part, 550: operation part, 600: turbine plant, 610: turbine, 620: power generator, C32: internal space, C32*a*: first hydraulic chamber, C32*b*: second hydraulic chamber, D11A: pressure detector, DK30: opening degree detector, DL10: hydraulic pressure detector, DL12: hydraulic pressure detector, DL32: hydraulic pressure detector, DS30: vibration detector, DV10: servo current detector, J11: branch part, J12: branch part, J21: branch part, J22*a*: branch part, J22*b*: branch part, L10: oil passage, L11: oil passage, L12: oil passage, L20: oil passage, L21: oil passage, L22: oil passage, L31: oil passage, L32: oil passage, L33: oil passage, P32*a*: first control oil port, P32*b*: second control oil port, P600: inlet pipe, V10: electromagnetic valve, V20: quick closing electromagnetic valve, V30: dump valve, V601: stop valve, V602: regulator valve

What is claimed is:

1. A hydraulic drive valve monitoring device for monitoring a hydraulic drive valve device including a valve body installed in a flow path of working fluid introduced into a turbine and a valve drive provided to change an opening degree of the valve body by an action of a control oil, the hydraulic drive valve monitoring device comprising:

a determination part, the determination part including an arithmetic unit and a memory, the memory configured to store a program that, when carried out by the arithmetic unit, causes the determination part to determine whether there is a sign of failure in the hydraulic drive valve device based on a result of comparison between a transition of a working fluid pressure measurement value obtained by measuring a pressure of the working fluid flowing into the valve body and a transition of a working fluid pressure reference value set for the pressure of the working fluid flowing into the valve body, when the opening degree of the valve body is changed; and an alarm device configured to output an alarm when the determination part determines that there is a sign of failure in the hydraulic drive valve device.

2. The hydraulic drive valve monitoring device according to claim 1, wherein:

the valve drive comprises:

a piston provided at an operation rod which operates the valve body part;

an oil cylinder housing the piston in an internal space, the internal space being divided by the piston into a first hydraulic chamber and a second hydraulic chamber; and an electromagnetic valve configured to switch an oil passage of the control oil according to a servo current so as to execute an opening action of the valve body by supplying the control oil to the first hydraulic chamber and execute a closing action of the valve body by draining the control oil as a drain oil from the first hydraulic chamber; and the determination part is configured to determine whether there is a sign of failure in the hydraulic drive valve device based on a result of comparison between a transition of a servo current measurement value obtained by measuring the servo current input into the electromagnetic valve and a transition of a servo current reference value set for the servo current input into the electromagnetic valve, when changing the opening degree of the valve body.

3. A hydraulic drive valve monitoring device for monitoring a hydraulic drive valve device including a valve body installed in a flow path of working fluid introduced into a turbine and a valve drive provided to change an opening degree of the valve body by an action of a control oil, the hydraulic drive valve monitoring device comprising:

a determination part, the determination part including an arithmetic unit and a memory, the memory configured to store a program that, when carried out by the arithmetic unit, causes the determination part to determine whether there is a sign of failure in the hydraulic drive valve device;

a failure cause identifier configured to identify, when the determination part determines that there is a sign of failure in the hydraulic drive valve device, a cause of the failure determined by the determination part; and a failure cause display configured to display the cause of the failure identified by the failure cause identifier, wherein:

the valve drive comprises:

a piston provided at an operation rod which operates the valve body part;

an oil cylinder housing the piston in an internal space, the internal space being divided by the piston into a first hydraulic chamber and a second hydraulic chamber; and a closing spring urging the valve body part in a closing direction, and is configured to execute an opening action of the valve body by supplying the control oil to the first hydraulic chamber and execute a closing action of the valve body by draining the control oil as a drain oil from the first hydraulic chamber;

the valve body includes a parent valve element and a child valve element, and is configured so that the child valve element starts to open when the parent valve element is in a fully-closed state and the parent valve element starts to open when the child valve element becomes a fully-open state;

the determination part is configured to make the determination based on a pressure of the control oil applied to the first hydraulic chamber when starting to open the valve body part, and on a result of comparison between a transition of a working fluid pressure measurement value obtained by measuring a pressure of the working fluid flowing into the valve body and a transition of a working fluid pressure reference value set for the pressure of the working fluid flowing into the valve body, when the opening degree of the valve body is changed; and the failure cause identifier, in a case where the pressure of the control oil applied to the first hydraulic chamber when starting to open the valve body is lower than a first correct value, (A) identifies that a decrease in spring force of the closing spring is the cause of the failure when a value by which the working fluid pressure measurement value varies when starting to open the valve body is a second correct value, and (B) identifies that the child valve element has the cause of the failure when the value by which the working fluid pressure measurement value varies when starting to open the valve body is lower than the second correct value.

4. The hydraulic drive valve monitoring device according to claim 3, further configured to find, when there are a plurality of causes of the failure identified by the failure cause identification part, an accuracy for each of the plurality of causes of the failure, wherein the failure cause display displays the plurality of causes of failure identified by the failure cause identification part and the accuracies for the plurality of causes of failure.

5. The hydraulic drive valve monitoring device according to claim 1, further configured to operate the valve drive so that when the alarm device outputs the alarm, the valve body alternates between the fully-open state and the fully-closed state.

* * * * *